No. 728,334. PATENTED MAY 19, 1903.
J. A. TRENTLAGE.
MILK AERATOR.
APPLICATION FILED JUNE 18, 1902.
NO MODEL.
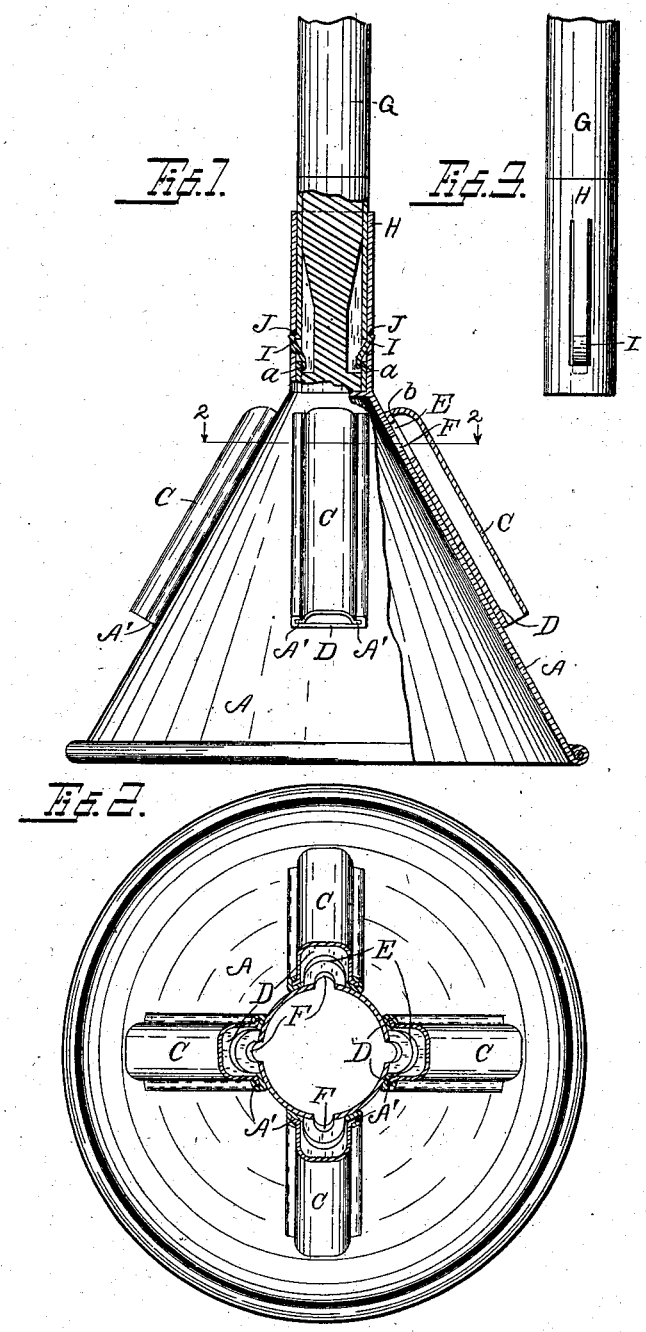

No. 728,334. Patented May 19, 1903.

UNITED STATES PATENT OFFICE.

JAY A. TRENTLAGE, OF MILWAUKEE, WISCONSIN.

MILK-AERATOR.

SPECIFICATION forming part of Letters Patent No. 728,334, dated May 19, 1903.

Application filed June 18, 1902. Serial No. 112,198. (No model.)

*To all whom it may concern:*

Be it known that I, JAY A. TRENTLAGE, a citizen of the United States, and a resident of Milwaukee, in the county of Milwaukee and State of Wisconsin, have invented certain new and useful Improvements in Milk-Aerators, of which the following is a description, reference being had to the accompanying drawings, which are a part of this specification.

My invention has for its object to provide a simple, effective, and sanitary device for aerating milk; and it consists in certain peculiarities of construction and combination of parts, to be hereinafter set forth with reference to the accompanying drawings and subsequently claimed.

In the drawings, Figure 1 represents a side elevation, partly in section. Fig. 2 is a horizontal sectional view on line 2 2 of Fig. 1. Fig. 3 is a perspective view of the handle, showing the spring-catch.

Referring by letter to the drawings, A is a conical-shaped cup having a socket B for the purpose of receiving a handle G. Said handle may be made of any desired material. The cup A has its largest diameter at the bottom and is open at that end, the top where it joins the socket being closed by a partition.
Close to the top of the cup A are a series of perforations F. Upon the outside of said cup and rigidly secured thereto are strips D, having upturned edges and forming grooves A' for receiving a removable air-duct C. The said air-duct being open at its bottom and closed at its top, is constructed so that friction will hold it from dropping down when in use, and a stop b, formed by closing the groove A' at its upper edge, prevents the said air-duct from pushing too far up. Said strips D have openings E in their upper ends to correspond with the opening in the cup A, as shown in Fig. 2, only they may be larger in order to admit of fastening them together. The socket B is provided with openings J, into which snap the springs I of the handle G. The springs I are secured in a cut-out portion of handle G by means of screws $a$ and H.

The operation of my device is as follows: The aerator is submerged into a can of milk to approximately a point at or near its bottom, and by so doing it is obvious that the cup A will carry down with it a volume of air, which will be slightly compressed by the milk which will enter its mouth, and thereby prevent said cup from filling with milk until the air has entirely escaped, which will not happen until the cup has been lowered to a certain depth, when the milk-pressure so compresses the air in the cup A as to overcome the resistance in the air-ducts and forces the air through the perforations F and ducts C, percolating through the entire body of milk. This operation is repeated until the entire body of the milk is cooled.

The principal advantage I claim for my invention is in having the removable air-ducts so that the machine may be thoroughly cleaned.

Having thus described my invention, what I claim as new, and desire to secure by Letters Patent, is—

In a milk-aerator, a conical-shaped cup, and a handle therefor, strips rigidly secured to the sides of said cup, air-ducts for removable engagement with said strips, means for permitting air to pass from the inside of said cup through said ducts.

In testimony whereof I affix my signature in presence of two witnesses.

JAY A. TRENTLAGE.

Witnesses:
EARL PETERSON,
L. A. THOMPSON.